(12) United States Patent
Freeman et al.

(10) Patent No.: US 10,094,239 B2
(45) Date of Patent: Oct. 9, 2018

(54) VANE ASSEMBLY FOR A GAS TURBINE ENGINE

(71) Applicants: Rolls-Royce North American Technologies, Inc, Indianapolis, IN (US); Rolls-Royce Corporation, Indianapolis, IN (US)

(72) Inventors: Ted J. Freeman, Danville, IN (US); Bruce E. Varney, Greenwood, IN (US); David J. Thomas, Brownsburg, IN (US); Jeffrey A. Walston, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 335 days.

(21) Appl. No.: 14/869,559

(22) Filed: Sep. 29, 2015

(65) Prior Publication Data

US 2016/0123164 A1   May 5, 2016

Related U.S. Application Data

(60) Provisional application No. 62/073,545, filed on Oct. 31, 2014.

(51) Int. Cl.
| F01D 25/00 | (2006.01) |
| F01D 5/28 | (2006.01) |
| F01D 9/04 | (2006.01) |
| F01D 9/06 | (2006.01) |

(52) U.S. Cl.
CPC .......... *F01D 25/005* (2013.01); *F01D 5/282* (2013.01); *F01D 5/284* (2013.01); *F01D 9/042* (2013.01); *F01D 9/065* (2013.01); *F05D 2230/642* (2013.01); *F05D 2300/6033* (2013.01); *Y02T 50/672* (2013.01); *Y02T 50/673* (2013.01)

(58) Field of Classification Search
CPC ........ F01D 25/005; F01D 9/042; F01D 5/284; F01D 5/282; F01D 9/065; Y02T 50/673; Y02T 50/672
See application file for complete search history.

(56) References Cited

U.S. PATENT DOCUMENTS

| 630,700 | A | 8/1899 | Hopkins | |
| 2,497,041 | A * | 2/1950 | Bodger | F01D 5/284 |
| | | | | 415/177 |
| 3,810,711 | A * | 5/1974 | Emmerson | F01D 5/184 |
| | | | | 29/889.721 |
| 5,630,700 | A * | 5/1997 | Olsen | F01D 5/189 |
| | | | | 415/134 |
| 6,514,046 | B1 | 2/2003 | Morrison et al. | |
| 6,884,030 | B2 * | 4/2005 | Darkins, Jr. | F01D 9/042 |
| | | | | 29/889.22 |

(Continued)

*Primary Examiner* — Woody Lee, Jr.
*Assistant Examiner* — Adam W Brown
(74) *Attorney, Agent, or Firm* — Barnes & Thornburg LLP

(57) ABSTRACT

A vane assembly for a gas turbine engine is disclosed in this paper. The vane assembly includes an inner platform, an outer platform, and a ceramic-containing airfoil. The ceramic-containing airfoil extends from the inner platform to the outer platform. A reinforcement spar made from a metallic material extends from the inner platform to the outer platform through a hollow core of the ceramic-containing airfoil.

15 Claims, 3 Drawing Sheets

(56) References Cited

U.S. PATENT DOCUMENTS

| | | |
|---|---|---|
| 7,410,342 B2 * | 8/2008 | Matheny .............. F01D 5/147 29/419.1 |
| 7,452,189 B2 | 11/2008 | Shi et al. |
| 7,604,456 B2 | 10/2009 | Schiavo, Jr. et al. |
| 7,648,336 B2 * | 1/2010 | Cairo .................. F01D 9/042 29/889.21 |
| 7,824,152 B2 * | 11/2010 | Morrison ............. F01D 9/042 415/135 |
| 7,874,059 B2 | 1/2011 | Morrison et al. |
| 7,934,900 B1 * | 5/2011 | Pask .................... F01D 5/284 415/115 |
| 8,206,098 B2 | 6/2012 | Prill et al. |
| 8,292,580 B2 | 10/2012 | Schiavo et al. |
| 8,777,583 B2 | 7/2014 | Darkins, Jr. et al. |
| 2012/0189427 A1 | 7/2012 | Kwon et al. |
| 2014/0147264 A1 | 5/2014 | Belmonte et al. |

* cited by examiner

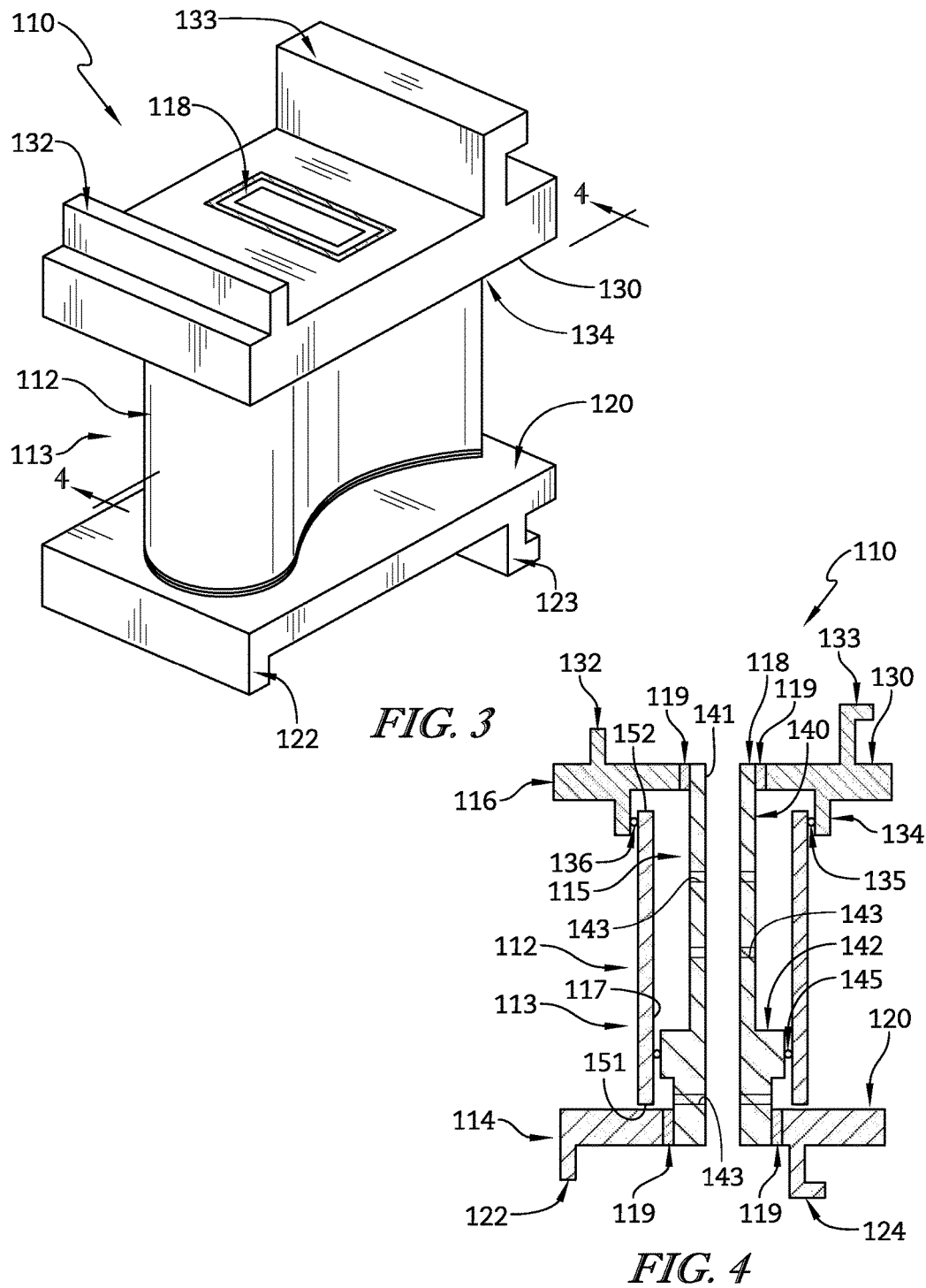

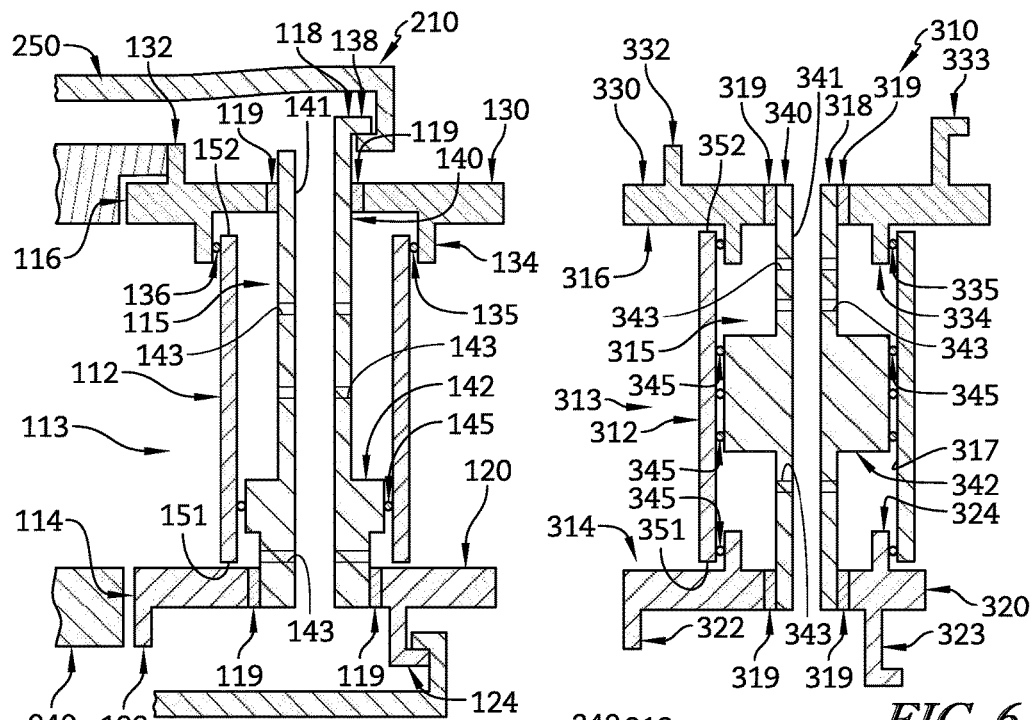
FIG. 5
FIG. 6
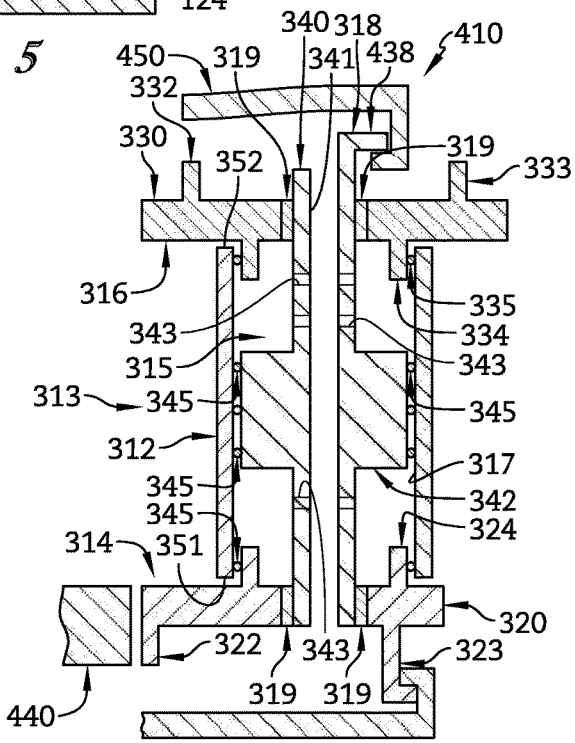
FIG. 7

VANE ASSEMBLY FOR A GAS TURBINE ENGINE

CROSS REFERENCE TO RELATED APPLICATIONS

This application claims priority to and the benefit of U.S. Provisional Patent Application No. 62/073,545, filed 31 Oct. 2014, the disclosure of which is now expressly incorporated herein by reference.

FIELD OF THE DISCLOSURE

The present disclosure relates generally to vanes for gas turbine engines. More specifically, the present disclosure relates to vanes that are assembled from ceramic-containing and metallic components.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high temperature materials and/or to be actively cooled by supplying relatively cool air to the vanes and blades. To this end, some airfoils for vanes and blades are being made from composite materials adapted to withstand very high temperatures. Design and manufacture of vanes and blades from composite materials presents challenges because of the complex geometry and strength required for the parts.

SUMMARY

The present disclosure may comprise one or more of the following features and combinations thereof.

According to one aspect of the present disclosure, a vane assembly for a gas turbine engine may include an inner platform made from a metallic material, an outer platform made from a metallic material, and a ceramic-containing airfoil that extends from the inner platform to the outer platform. The ceramic-containing airfoil may be engaged with at least one of the inner platform and the outer platform so that some aerodynamic loads applied to the ceramic-containing airfoil are transferred directly to at least one of the inner platform and the outer platform.

In some embodiments, the vane assembly may also include a reinforcement spar made from a metallic material. The reinforcement spar may extend from the inner platform to the outer platform through a hollow core of the ceramic-containing airfoil. The reinforcement spar may engage an interior surface of the ceramic-containing airfoil so that some aerodynamic loads applied to the ceramic-containing airfoil are transferred directly to at least one of the inner platform and the outer platform.

In some embodiments, a first end of the ceramic-containing airfoil may be received in one of the inner platform and the outer platform to transfer load. The interior surface of the ceramic-containing airfoil that is engaged by the reinforcement spar may be adjacent to a second end of the ceramic-containing airfoil.

In some embodiments, the reinforcement spar may engage the interior surface of the ceramic-containing airfoil along half or less of the distance between the inner platform and the outer platform. In some embodiments, the ceramic-containing airfoil may be disengaged from the inner platform and the outer platform adjacent to the second end of the ceramic-containing airfoil. In some embodiments, the reinforcement spar may be formed to include an attachment flange adapted to be coupled to a turbine case and the attachment flange may extend beyond the outer platform.

In some embodiments, a first end of the ceramic-containing airfoil receives a portion of one of the inner platform and the outer platform to transfer load. A second end of the ceramic-containing airfoil may receive a portion of the other of the inner platform and the outer platform to transfer load.

In some embodiments, the interior surface of the ceramic-containing airfoil may be engaged by the reinforcement spar about midway between the first end and the second end. The reinforcement spar may engage the interior surface of the ceramic-containing airfoil along half or less of the distance between the inner platform and the outer platform. The reinforcement spar may be formed to include an attachment flange adapted to be coupled to a turbine case and the attachment flange is extends beyond the outer platform.

According to another aspect of the present disclosure, a vane assembly for a gas turbine engine may include an inner platform made from a metallic material, an outer platform made from a metallic material, and a ceramic-containing airfoil that extends from the inner platform to the outer platform and engaged with at least one of the inner platform and the outer platform.

In some embodiments, the vane assembly may include a reinforcement spar made from a metallic material. The reinforcement spar may be coupled to at least one of the inner platform and the outer platform that extends through a hollow core of the ceramic-containing airfoil and engages an interior surface of the ceramic-containing airfoil.

In some embodiments, the reinforcement spar may be coupled to both the inner platform and the outer platform by bicast joints. The reinforcement spar may be formed to include an attachment flange adapted to be coupled to a turbine case and the attachment flange may extend beyond the outer platform.

In some embodiments, the reinforcement spar may engage the interior surface of the ceramic-containing airfoil along half or less of the distance between the inner platform and the outer platform. The interior surface of the ceramic-containing airfoil that is engaged by the reinforcement spar may be adjacent to a second end of the ceramic-containing airfoil. An opposing end of the ceramic-containing airfoil may be engaged with the other of the inner platform and the outer platform adjacent to the opposing end to transfer load.

In some embodiments, the reinforcement spar may engage the interior surface of the ceramic-containing airfoil along half or less of the distance between the inner platform and the outer platform. The ceramic-containing airfoil may be engaged with both the inner platform and the outer platform to transfer load to both the inner platform and the outer platform.

According to another aspect of the present disclosure, a method of making a vane assembly is taught. The method may include positioning a ceramic-containing airfoil between an inner platform made from a metallic material and an outer platform made from a metallic material, engaging at least one end of the ceramic-containing airfoil with at least one of the inner platform and the outer platform to transfer load, inserting a reinforcement spar made from a metallic material through an aperture formed in the inner platform, a hollow core of the ceramic-containing airfoil, and an aperture formed in the outer platform, and forming bicast joints between the inner platform and the reinforcement spar as well as between the outer platform and the reinforcement spar. The reinforcement spar may engage an interior surface of the ceramic-containing airfoil to transfer aerodynamic load applied to the ceramic-containing airfoil to the inner platform and the outer platform through the bicast joints.

These and other features of the present disclosure will become more apparent from the following description of the illustrative embodiments.

BRIEF DESCRIPTION OF THE DRAWINGS

FIG. 3 is a perspective view of the vane assembly of FIG. 2 showing that the vane assembly includes inner and outer platforms and an airfoil that extends between the platforms;

FIG. 4 is a detail cross-sectional view of the vane assembly shown in FIGS. 2 and 3 showing that the vane assembly includes a reinforcement spar that extends through a hollow core of the vane assembly to transmit some aerodynamic load from the airfoil to the platforms;

FIG. 5 is a detail cross-sectional view of a second vane assembly showing that the vane assembly includes inner and outer platforms, an airfoil that extends between the platforms, and a reinforcement spar that extends through a hollow core of the vane assembly to transmit some aerodynamic load from the airfoil to the platforms;

FIG. 6 is a detail cross-sectional view of a third vane assembly showing that the vane assembly includes inner and outer platforms, an airfoil that extends between the platforms, and a reinforcement spar that extends through a hollow core of the vane assembly to transmit some aerodynamic load from the airfoil to the platforms and some aerodynamic load directly to a turbine case coupled to the vane assembly; and FIG. 7 is a detail cross-sectional view of a fourth vane assembly showing that the vane assembly includes inner and outer platforms, an airfoil that extends between the platforms, and a reinforcement spar that extends through a hollow core of the vane assembly to transmit some aerodynamic load from the airfoil to the platforms and some aerodynamic load directly to a turbine case coupled to the vane assembly.

DETAILED DESCRIPTION OF THE DRAWINGS

Figure 1:
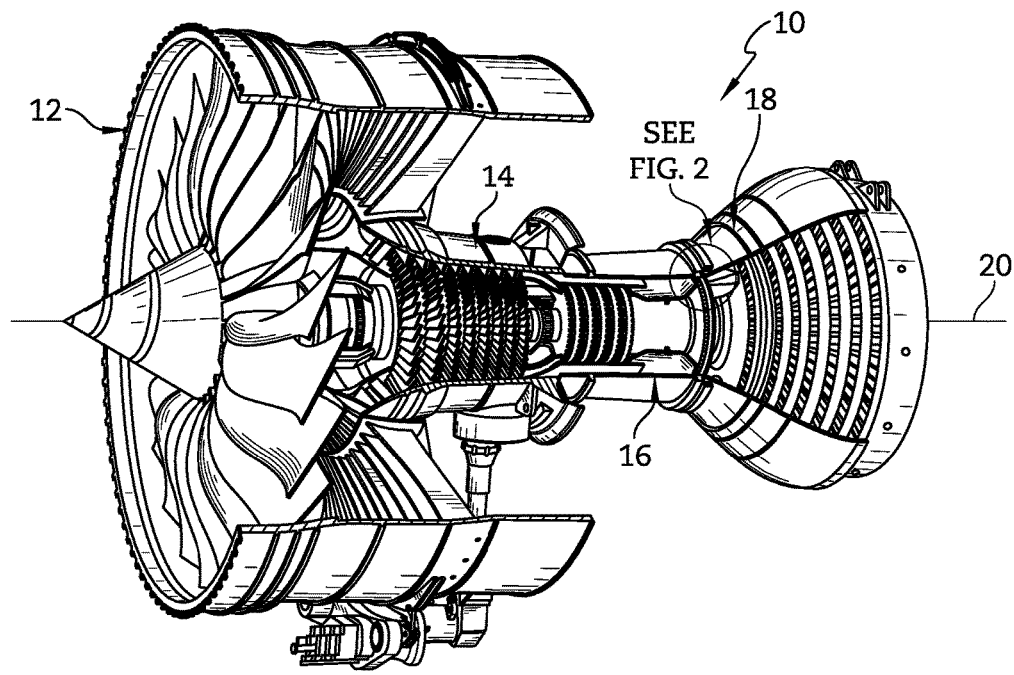
FIG. 1 is a perspective view of a gas turbine engine showing that a portion of a turbine assembly is arranged to receive hot, high pressure combustion products from a combustor.

For the purposes of promoting an understanding of the principles of the disclosure, reference will now be made to a number of illustrative embodiments illustrated in the drawings and specific language will be used to describe the same.

An illustrative aerospace gas turbine engine 10 is cutaway in FIG. 1 to show that the engine 10 includes a fan 12, a compressor 14, a combustor 16, and a turbine 18. The fan 12 is driven by the turbine 18 and provides thrust for propelling an air vehicle (not shown). The compressor 14 compresses and delivers air to the combustor 16. The combustor 16 mixes fuel with the compressed air received from the compressor 14 and ignites the fuel. The hot high pressure products of the combustion reaction in the combustor 16 are directed into the turbine 18 to cause the turbine 18 to rotate about an axis 20 and drive the compressor 14 and the fan 12.

Figure 2:
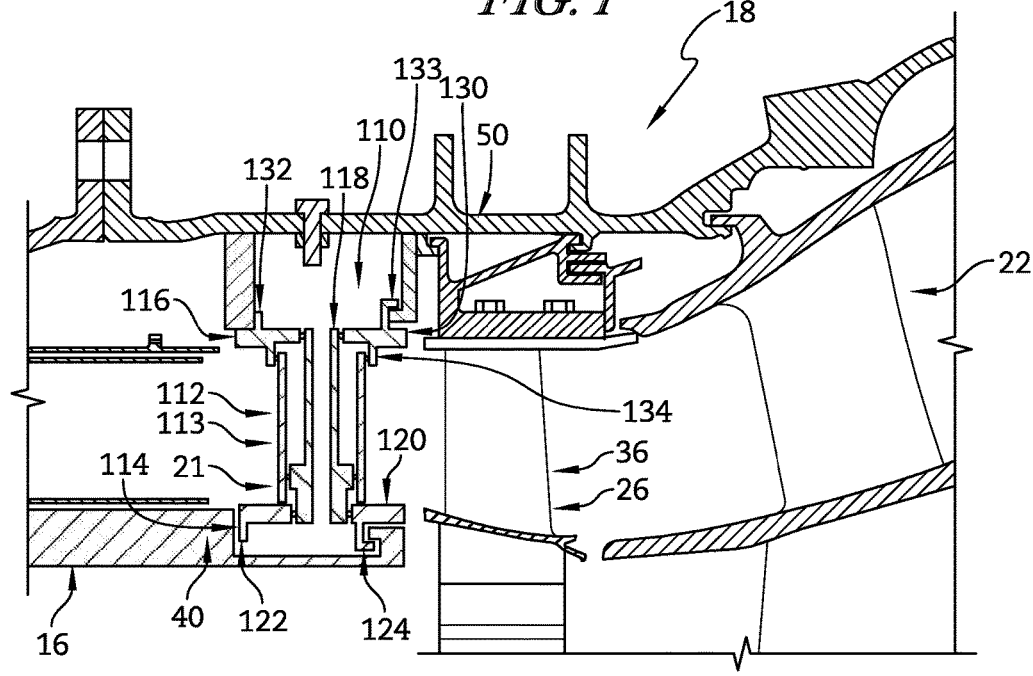
FIG. 2 is a cross-sectional view of the portion of the turbine assembly noted in FIG. 1 that is adjacent to the combustor showing that the turbine assembly includes a multi-component vane assembly that redirects hot, high pressure combustion products before they interact with a bladed turbine wheel.

Referring now to FIG. 2, a portion of the turbine 18 is shown to include first and second static turbine vane rings 21, 22 and a turbine wheel assembly 26. The vane rings 21, 22 extend across the flow path of the hot, high-pressure combustion products from the combustor 16 to direct the combustion products toward blades 36 of the turbine wheel assembly 26. The blades 36 are in turn pushed by the combustion products to cause the turbine wheel assembly 26 to rotate; thereby, driving the rotating components of the compressor 14 and the fan 12.

The first vane ring 21 is illustratively made up of a plurality of individual vane assemblies 110 as shown in FIGS. 3 and 4. The vane assemblies 110 are arranged circumferentially adjacent to one another to form a ring that extends around the axis 20. In the illustrative embodiment, each vane assembly 110 includes a single airfoil 112 that extends across a gas path 113 defined by the assembly 110 and has an aerodynamic shape so that the airfoil 112 directs combustion products from the combustor 16 toward blades 36 of the turbine wheel assembly 26. In some embodiments, each vane assembly 110 may include more than one airfoil 112.

In order to withstand the temperatures applied by the hot, high-pressure combustion products from the combustor 16, the first vane assembly 110 includes a ceramic-containing airfoil 112 shown in FIG. 2. Ceramic-containing components, like the airfoil 112, are adapted to withstand very high operating temperatures that might not be possible for metallic components. In the illustrative embodiment, the airfoil 112 is made from a ceramic-containing material; and, more particularly, a ceramic matrix composite (CMC). Even more particularly, the illustrative airfoil 112 is made from a SiC—SiC ceramic matrix composite including a silicon carbide matrix and silicon carbide fibers. For purposes of this application, a ceramic-containing material is any monolithic ceramic or composite in which at least one constituent is a ceramic.

The vane assembly 110 also includes an inner platform 114 and an outer platform 116 coupled to opposing ends of the airfoil 112 to support the airfoil 112 as shown in FIGS. 2-4. A reinforcement spar 118 included in the vane assembly 110 extends from the inner platform 114 to the outer platform 116 through a hollow core 115 formed in the airfoil 112. The reinforcement spar 118 is made from a metallic material and is coupled to the platforms 114, 116 by bicast joints 119 as shown in FIG. 4. The reinforcement spar 118 engages an interior surface 117 along a selected portion of the airfoil 112 to receive loads from the airfoil 112. In the illustrative embodiment, some aerodynamic loads applied to the airfoil 112 are transferred directly to the platforms 114, 116 and some aerodynamic loads applied to the airfoil 112 are transferred through the reinforcement spar 118 to the platforms 114, 116.

The inner platform 114 is adapted to be coupled to a combustor case 40 and to transfer aerodynamic loads from the airfoil 112 to the combustor case 40 as shown in FIG. 2. The inner platform 114 is illustratively a monolithic metallic component that includes an inner panel 120 and inner attachment flanges 122, 123 as shown in FIGS. 3 and 4. The inner panel 120 defines one side of the gas path 113. The inner attachment flanges 122, 123 extends from the inner panel 120 away from the outer platform 116 to engage the combustor case 40 and transmit loads from the inner platform 114 to the combustor case 40.

The outer platform 116 is adapted to be coupled to a turbine case 50 and to transfer aerodynamic loads from the airfoil 112 to the turbine case 50 as shown in FIG. 2. The outer platform 116 is illustratively a monolithic metallic component that includes an outer panel 130 and outer attachment flanges 132, 133 as shown in FIGS. 3 and 4. The outer panel 130 defines one side of the gas path 113. The outer attachment flanges 132, 133 extend from the outer panel 130 away from the inner platform 114 to engage the turbine case 50 and transmit loads from the outer platform 116 to the turbine case 50.

The reinforcement spar 118 includes a central post 140 and an engagement flange 142 as shown in FIG. 4. The central post 140 extends through the hollow core 115 of the airfoil 112 and is coupled to the platforms 114, 116. In the illustrative embodiment, the central post 140 forms a passageway 141 and is adapted to conduct cooling air from outside the airfoil 112 into the hollow core 115 of the airfoil 112 via perforations 143 formed in the central post 140. The engagement flange 142 extends from the central post 140 and engages the interior surface 117 of the airfoil 112.

In the illustrative embodiment, the engagement flange 142 extends along only a portion of the height of the airfoil 112 between the platforms 114, 116 as shown in FIG. 4. More specifically, in the example shown, the engagement flange 142 engages the interior surface 117 of the airfoil 112 along about one-fourth of the height of the airfoil 112. In some embodiments, the engagement flange 142 engages the interior surface 117 of the airfoil 112 along about one-half or more of the height of the airfoil 112. A rope seal 145 is illustratively arranged in the hollow core 115 to separate the engagement flange 142 from interior surface 117 of the airfoil 112. In other embodiments, other compliant or non-compliant (rigid) spacers may be arranged to separate the engagement flange 142 from interior surface 117 of the airfoil 112.

In the illustrative embodiment of FIGS. 1-4, the engagement flange 142 engages the interior surface 117 of the airfoil 112 at an inner end 151 of the airfoil 112 near the inner platform 114 as shown in FIG. 4. The inner end 151 of the airfoil 112 is moreover free-floated relative to the inner platform 114 and is therefore supported at the inner end 151 by the reinforcement spar 118. More specifically, on account of the engagement between the airfoil 112 and the reinforcement spar 118 at the inner end 151 of the airfoil 112, aerodynamic load applied to the airfoil 112 is transferred to the inner platform 114 and the outer platform 116 through the reinforcement spar 118. The platforms 114 then pass the load on to the combustor case 40 and the turbine case 50. In other embodiments, the inner end 151 of the airfoil 112 may be engaged with the inner platform 114 such that the inner end 151 is directly supported by the inner platform 114 when aerodynamic loads are applied to the airfoil 112.

The outer platform 116 is illustratively formed to include an outer lip 134 as shown in FIG. 4. The outer lip 134 extends from the outer panel 130 toward the inner platform 114 and provides an outer opening 136 that receives an outer end 152 of the airfoil 112. The airfoil 112 near the outer end 152 directly engages the outer lip 134 to transfer load to the outer platform 116. The outer platform 116 can then pass the load onto the turbine case 50 or share the load with the inner platform 114 (and combustor case 40) through the reinforcement spar 118. In other embodiments, the outer end 152 of the airfoil 112 may be partly or fully supported at the outer end 152 by the reinforcement spar 118.

A rope seal 135 is illustratively arranged to separate the airfoil 112 from the outer lip 134 of the outer platform 116. In other embodiments, other compliant or non-compliant (rigid) spacers may be arranged to separate the airfoil 112 from the outer lip 134 of the outer platform 116.

A second illustrative vane assembly 210 is shown in FIG. 5. The vane assembly 210 is configured for use in a gas turbine engine and is substantially similar to the vane assembly 110 shown in FIGS. 1-4 and described herein. Accordingly, similar reference numbers indicate features that are common between the vane assembly 110 and the vane assembly 210.

In addition to the features of the vane assembly 110, the reinforcement spar 118 of the vane assembly 210 is formed to include an attachment flange 138 as shown in FIG. 5. The attachment flange 138 is directly coupled to a turbine case 250 to transfer load to the turbine case 250 bypassing the outer platform 116. In the illustrative embodiment, the attachment flange 138 extends beyond the outer platform 116.

A third illustrative vane assembly 310 includes a ceramic-containing airfoil 312, an inner platform 314, and an outer platform 316 coupled to opposing ends of the airfoil 312 as shown in FIG. 6. A reinforcement spar 318 included in the vane assembly 310 extends from the inner platform 314 to the outer platform 316 through a hollow core 315 formed in the airfoil 312. The reinforcement spar 318 is made from a metallic material and is coupled to the platforms 314, 316 by bicast joints 319 as shown in FIG. 6. The reinforcement spar 318 engages an interior surface 317 along a selected portion of the airfoil 312 to receive loads from the airfoil 312. In the illustrative embodiment, some aerodynamic loads applied to the airfoil 312 are transferred directly to the platforms 314, 316 and some aerodynamic loads applied to the airfoil 312 are transferred through the reinforcement spar 318 to the platforms 314, 316.

The inner platform 314 is adapted to be coupled to a combustor case 40 and to transfer aerodynamic loads from the airfoil 312 to the combustor case 40 as shown in FIG. 6. The inner platform 314 is illustratively a monolithic metallic component that includes an inner panel 320 and inner attachment flanges 322, 323 as shown in FIG. 6. The inner panel 320 defines one side of the gas path 313. The inner attachment flanges 322, 323 extends from the inner panel 320 away from the outer platform 316 to engage the combustor case 40 and transmit loads from the inner platform 314 to the combustor case 40.

The outer platform 316 is adapted to be coupled to a turbine case 50 and to transfer aerodynamic loads from the airfoil 312 to the turbine case 50 as shown in FIG. 6. The outer platform 316 is illustratively a monolithic metallic component that includes an outer panel 330 and outer attachment flanges 332, 333 as shown in FIG. 6. The outer panel 330 defines one side of the gas path 313. The outer attachment flanges 332, 333 extend from the outer panel 330 away from the inner platform 314 to engage the turbine case 50 and transmit loads from the outer platform 316 to the turbine case 50.

The reinforcement spar 318 includes a central post 340 and an engagement flange 342 as shown in FIG. 6. The central post 340 extends through the hollow core 315 of the airfoil 312 and is coupled to the platforms 314, 316. In the illustrative embodiment, the central post 340 forms a passageway 341 and is adapted to conduct cooling air from outside the airfoil 312 into the hollow core 315 of the airfoil 312 via perforations 343. The engagement flange 342 extends from the central post 340 and engages the interior surface 317 of the airfoil 312.

In the illustrative embodiment, the engagement flange 342 extends along only a portion of the height of the airfoil 312 between the platforms 314, 316 as shown in FIG. 6. More specifically, in the example shown, the engagement flange 342 engages the interior surface 313 of the airfoil 312 along about one-half of the height of the airfoil 312. In some embodiments, the engagement flange 342 engages the interior surface 313 of the airfoil 312 along greater than or less than half of the height of the airfoil 312. Rope seals 345 are illustratively arranged in the hollow core 315 to separate the engagement flange 342 from interior surface 313 of the airfoil 312. In other embodiments, other compliant or non-compliant (rigid) spacers may be arranged to separate the engagement flange 342 from interior surface 313 of the airfoil 312.

In the illustrative embodiment of FIG. 6, the engagement flange 342 engages the interior surface 317 of the airfoil 312 about mid-way between an inner end 351 and an outer end 352 of the airfoil 312 as shown in FIG. 6. Accordingly, the reinforcement spar 318 conducts some of the aerodynamic load applied to the airfoil 312 to each of the platforms 314, 316. The airfoil 312 is further itself engaged directly with both the inner platform 314 and the outer platform 316. Accordingly, some of the aerodynamic load applied to the airfoil 312 is transferred directly to each of the platforms 314, 316.

The inner platform 314 is illustratively formed to include an inner projection 324 as shown in FIG. 6. The inner projection 324 extends from the inner panel 320 toward the outer platform 316 and is received in the hollow core 315 of the airfoil 312 at the inner end 351 of the airfoil 312. The airfoil 312 near the inner end 351 directly engages the inner projection 324 to transfer load to the inner platform 314. In other embodiments, the inner end 351 of the airfoil 312 may be partly or fully supported at the inner end 351 by the reinforcement spar 318.

The outer platform 316 is illustratively formed to include an outer projection 334 as shown in FIG. 6. The outer projection 334 extends from the outer panel 330 toward the inner platform 314 and is received in the hollow core 315 of the airfoil 312 at the outer end 352 of the airfoil 312. The airfoil 312 near the outer end 352 directly engages the outer projection 334 to transfer load to the outer platform 316. In other embodiments, the outer end 352 of the airfoil 312 may be partly or fully supported at the outer end 352 by the reinforcement spar 318.

Rope seals 335 are illustratively arranged to separate the airfoil 312 from the projections 324, 334 of the platforms 314, 316. In other embodiments, other compliant or non-compliant (rigid) spacers may be arranged to separate the airfoil 312 from the platforms 314, 316.

A fourth illustrative vane assembly 410 is shown in FIG. 7. The vane assembly 410 is configured for use in a gas turbine engine and is substantially similar to the blade track 310 shown in FIG. 6 and described herein. Accordingly, similar reference numbers indicate features that are common between the vane assembly 310 and the vane assembly 410.

In addition to the features of the vane assembly 310, the reinforcement spar 318 of the vane assembly 410 is formed to include an attachment flange 438 as shown in FIG. 7. The attachment flange 338 is directly coupled to a turbine case 450 to transfer load to the turbine case 450 bypassing the outer platform 316. In the illustrative embodiment, the attachment flange 338 extends beyond the outer platform 316.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane assembly for a gas turbine engine, the assembly comprising
    an inner platform made from a metallic material,
    an outer platform made from a metallic material,
    a ceramic-containing airfoil that extends from the inner platform to the outer platform and engaged with at least one of the inner platform and the outer platform so that some aerodynamic loads applied to the ceramic-containing airfoil are transferred directly to at least one of the inner platform and the outer platform, and
    a reinforcement spar made from a metallic material that extends from the inner platform to the outer platform through a hollow core of the ceramic-containing airfoil and engages an interior surface of the ceramic-containing airfoil so that some aerodynamic loads applied to the ceramic-containing airfoil are transferred to at least one of the inner platform and the outer platform,
    wherein the ceramic-containing airfoil includes a first end and a second end and the interior surface of the ceramic-containing airfoil engages the reinforcement spar adjacent to the second end of the ceramic-containing airfoil,
    wherein the first end of the ceramic-containing airfoil is received in one of the inner platform and the outer platform to transfer load,
    wherein the ceramic-containing airfoil is disengaged from the inner platform adjacent to the second end of the ceramic-containing airfoil.

2. The vane assembly of claim 1, wherein the reinforcement spar engages the interior surface of the ceramic-containing airfoil along half or less of the distance between the inner platform and the outer platform.

3. The vane assembly of claim 1, wherein the reinforcement spar is formed to include an attachment flange adapted to be coupled to a turbine case and the attachment flange extends beyond the outer platform.

4. The vane assembly of claim 1, wherein the second end of the ceramic-containing airfoil receives a portion of the inner platform.

5. The vane assembly of claim 4, wherein the interior surface of the ceramic-containing airfoil is engaged by the reinforcement spar about midway between the first end and the second end.

6. The vane assembly of claim 4, wherein the reinforcement spar engages the interior surface of the ceramic-containing airfoil along half or less of the distance between the inner platform and the outer platform.

7. The vane assembly of claim 4, wherein the reinforcement spar is formed to include an attachment flange adapted to be coupled to a turbine case and the attachment flange is extends beyond the outer platform.

8. A vane assembly for a gas turbine engine, the assembly comprising
an inner platform made from a metallic material and arranged to extend at least partway around an axis of the vane assembly,
an outer platform made from a metallic material,
a ceramic-containing airfoil that extends from the inner platform to the outer platform and engaged with at least one of the inner platform and the outer platform, and
a reinforcement spar made from a metallic material coupled to at least one of the inner platform and the outer platform that extends through a hollow core of the ceramic-containing airfoil and engages an interior surface of the ceramic-containing airfoil,
wherein the reinforcement spar is formed to include an attachment flange adapted to be coupled to a turbine case and the attachment flange extends radially outward away from the inner platform and beyond the outer platform.

9. The vane assembly of claim 8, wherein the reinforcement spar is coupled to both the inner platform and the outer platform by bicast joints.

10. The vane assembly of claim 8, wherein the reinforcement spar engages the interior surface of the ceramic-containing airfoil along half or less of the distance between the inner platform and the outer platform.

11. The vane assembly of claim 10, wherein the interior surface of the ceramic-containing airfoil engages the reinforcement spar adjacent to a second end of the ceramic-containing airfoil.

12. The vane assembly of claim 11, wherein an opposing end of the ceramic-containing airfoil is engaged with the other of the inner platform and the outer platform adjacent to the opposing end to transfer load.

13. The vane assembly of claim 10, wherein the reinforcement spar engages the interior surface of the ceramic-containing airfoil along less than half of the distance between the inner platform and the outer platform.

14. The vane assembly of claim 13, wherein the ceramic-containing airfoil is engaged with both the inner platform and the outer platform to transfer load to both the inner platform and the outer platform.

15. A method of making a vane assembly, the method comprising
positioning a ceramic-containing airfoil between an inner platform made from a metallic material and an outer platform made from a metallic material so that the ceramic-containing airfoil extends from the inner platform to the outer platform,
engaging at least one end of the ceramic-containing airfoil with at least one of the inner platform and the outer platform to transfer load,
inserting a reinforcement spar made from a metallic material through an aperture formed in the inner platform, a hollow core of the ceramic-containing airfoil, and an aperture formed in the outer platform so that the reinforcement spar extends from the inner platform to the outer platform, and
forming bicast joints between the inner platform and the reinforcement spar as well as between the outer platform and the reinforcement spar,
wherein the reinforcement spar engages an interior surface of the ceramic-containing airfoil adjacent to an end of the ceramic-containing airfoil to transfer aerodynamic load applied to the ceramic-containing airfoil to the inner platform and the outer platform through the bicast joints,
wherein the ceramic-containing airfoil includes a first end and a second end and the interior surface of the ceramic-containing airfoil engages the reinforcement spar adjacent to the second end of the ceramic-containing airfoil,
wherein the first end of the ceramic-containing airfoil is received in the outer platform to transfer load,
wherein the ceramic-containing airfoil is disengaged from the inner platform adjacent to the second end of the ceramic-containing airfoil.

* * * * *